(12) United States Patent
Demicheli et al.

(10) Patent No.: US 6,208,184 B1
(45) Date of Patent: Mar. 27, 2001

(54) METHOD AND DEVICE FOR DELAYING SELECTED TRANSITIONS IN A DIGITAL DATA STREAM

(75) Inventors: Marco Demicheli, Binago; Melchiorre Bruccoleri, Rho; Maurizio Malfa, Magenta; Giacomino Bollati, Castel San Giovanni, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/451,051

(22) Filed: Nov. 30, 1999

(30) Foreign Application Priority Data

Dec. 15, 1998 (EP) .................................................. 98830756

(51) Int. Cl.$^7$ ....................................................... H03L 7/00
(52) U.S. Cl. ........................................... 327/161; 327/263
(58) Field of Search .................................. 327/263, 161, 327/211, 395, 24, 172, 176, 31, 35, 26

(56) References Cited

U.S. PATENT DOCUMENTS

| 5,559,645 | 9/1996 | Miyazawa et al. ..................... 360/51 |
| 5,600,501 | 2/1997 | Yamakoshi et al. .................... 360/51 |
| 5,949,269 | * 9/1999 | Allen .................................... 327/285 |

FOREIGN PATENT DOCUMENTS

| 0 447 342 A2 | 5/1991 | (EP) . |
| 98/10420 | 12/1998 | (WO) . |

OTHER PUBLICATIONS

"Write Precompensation for Peak Detection of Partial Response Signals", IBM Technical Disclosure Bulletin. vol. 37 No. 04A, Apr. 1994.

Che, Nonlinearity Measurements and Write Precompensation Studies of a PRML Recording Channel, Apr. 18, 1995.

Che, "Nonlinearity Measurements and Write Precompensation Studies for a PRML Recording Channel", IEEE Transactions on Magnetics, vol. 31, No. 6, Nov. 1995.

* cited by examiner

Primary Examiner—Toan Tran
Assistant Examiner—Linh Nguyen
(74) Attorney, Agent, or Firm—Theodore E. Galanthay; Allen, Dyer, Doppelt, Milbrath & Gilchrist, P.A.

(57) ABSTRACT

A method and circuit are provided for delaying a transition in a digital data stream fed to a write head of a mass storage device by a certain time interval when the transition occurs at a clock phase following the one during which a preceding transition has occurred, for pre-compensating intersymbol nonlinear interference effects suffered when reading the stored data. The method includes feeding digital data stream to be stored and a clock signal to a first circuit and outputting a pair of digital streams from the first circuit. The first stream assumes a first logic value every time a transition of the input stream occurs during a clock phase not successive to a clock phase during which a transition of the input stream has occurred. The second stream assumes the first logic value every time a transition of the input stream occurs during a clock phase following a clock phase during which a transition has taken place in the input stream. The method also includes feeding the two digital streams and the clock signal to the inputs of a second circuit and outputting the digital data stream from the second circuit directed to the write head. The transitions immediately following a preceding transition are delayed by the pre-established time interval, by sampling the two digital streams with a pair of flip-flops, each of which is respectively timed by clock signals respectively delayed by a certain different time interval.

34 Claims, 3 Drawing Sheets

METHOD AND DEVICE FOR DELAYING SELECTED TRANSITIONS IN A DIGITAL DATA STREAM

FIELD OF THE INVENTION

The present invention relates to read/write channels of mass data storage devices, for example of a hard disk drive, and more particularly, to a method and circuit of pre-compensation, during a write phase, of the effects of non-linear intersymbol interference during a subsequent read phase of the recorded data.

BACKGROUND OF THE INVENTION

Due to the ever-growing density with which data must be stored on hard disks or similar magnetic media, it is useful, during the write phase of the data, to delay a transition, i.e. the switching of a bit from a low state to a high state or vice-versa, when in the immediately preceding clock phase there has been a transition in the opposite direction. This approach serves to compensate the shift of the physical position of the second transition towards the preceding transition already recorded on the hard disk. This anticipation (during a reading phase) of the second transition is mainly due to the so-called nonlinear intersymbol interference caused by the presence of a demagnetizing field produced by an immediately preceding transition, as well as by the partial data deletion in the transition zone due to the high density of data stored on the hard disk.

To implement this pre-compensation, i.e. to delay the transitions that immediately follow another transition, special circuitry is used comprising a delay circuit and a multiplexer to switch from the system clock to a slightly delayed clock to delay the output data stream. This switching is effected by a signal generated by a control circuit that identifies two transitions intervening in the input data stream as consecutive transitions.

Due to the generally high system clock frequencies, this type of approach has several drawbacks. A first drawback is that to operate at the system clock frequency, the delay circuit and the control circuit must be realized in ECL technology (Emitter Coupled Logic), with a consequent increase in the complexity and costs of the fabrication process compared to a typically preferred fully CMOS technology (Complementary Metal Oxide Semiconductor). A further drawback is that the multiplexer, operating at a high frequency, generates glitches that reduce the reliability of the device itself. Moreover, the delay circuit may delay the system clock for up to a half period, because greater delays would imply a write error at the instant of the switching from the delayed clock back to the system clock.

SUMMARY OF THE INVENTION

An object of the present invention is to provide a pre-compensation method for overcoming such drawbacks and limitations of the conventional approach and provide an implementing circuit that may be realized in CMOS technology. These and other objects are achieved by the method and circuit of the present invention.

The method of the invention is for delaying a transition in a digital data stream directed towards a write head of a mass storage device by a certain time interval when the transition occurs at the clock pulse following the one during which a transition has already occurred, for pre-compensating for the effects of nonlinear intersymbol interference during a reading of the recorded data. The method includes feeding a first circuit with a digital data stream to be recorded and with a clock signal and outputting a pair of digital streams. The first stream assumes a first logic value every time a transition in the input stream occurs at a clock pulse not following a clock pulse during which a transition has taken place. The second stream assumes the first logic value every time a transition in the input stream occurs at a clock pulse that follows a clock pulse during which a transition has taken place.

The method also includes feeding the two digital streams and the clock signal to the inputs of a second circuit and outputting from the second circuit, the digital stream of data directed towards the write head. The transitions immediately successive to a preceding transition are delayed by the pre-established time interval, by sampling the two streams by a flip-flop pair, each of which is timed by a clock signal delayed by a respectively different time interval. The temporal difference between the different delay intervals is equal to a pre-established time interval, and the two signals output from the flip-flop pair are re-combined through an XOR logic gate into the output digital stream. Preferably, the two streams are preliminarily resynchronized by way of a first pair of flip-flops, timed by the clock signal, before effecting the sampling with the two diversely delayed clock signals.

According to another aspect of the invention, a circuit is provided for delaying each transition that immediately follows a preceding transition in a digital stream of input data. The circuit comprises a control circuit including at least a pair of propagation paths of a digital stream of input data, each path having an output bistable switch timed by a clock signal. The output bistable switch of a first path outputs a first digital stream of transitions nonsuccessive to another transition, and the output bistable switch of the other path outputs a second digital stream of transitions successive to another transition.

The circuit further comprises a delay circuit including at least an output XOR logic gate receiving the first and second digital streams whose transitions are independently delayed by different time intervals such that the difference is equal to a prefixed time interval, through respective inputs. The delay circuit outputs a recombined digital stream of selectively delayed data identical to the data of the input stream. The bistable output switches of the two propagation paths of the control circuit may be flip-flops synchronized by the clock signal and the paths may optionally comprise resynchronizing input flip-flops and a combinatory logic circuit identifying first transitions not immediately following a preceding transition and second transitions immediately following a preceding transition. Such a logic circuit may include an XOR layer, an AND layer and another XOR layer.

Since the transitions so discriminated of one of the two streams of each pair of propagation paths may be delayed with respect to the transitions of the other stream, of a certain freely programmable time interval, the delay and reconfirmation block of the circuit of the invention allows for the introduction of delays even greater than a half period of clock signal, without causing any write error on the storage support.

According to a particularly favorable aspect of the present invention, the control circuit and the delay and recombination circuit may comprise multiple sets of components arranged in a tree-like structure and reciprocally connected by way of a plurality of pairs of propagation paths. In this way and by feeding several distinct input digital streams of fractional clock frequencies, the circuits may function at a reduced (fractional) clock frequency. Therefore, even the most critical parts in terms of speed requirements, as for example the control circuit (discrimination between the two types of transitions), may be realized in CMOS technology with attendant advantages in terms of simplicity of the design and reduced costs.

BRIEF DESCRIPTION OF THE DRAWINGS

These and other advantages and aspects of the present invention will become even more evident to the experts in the field through the ensuing detailed description of several embodiments and by referring to the annexed drawings, wherein.

DETAILED DESCRIPTION OF THE PREFERRED EMBODIMENTS

Figure 1:
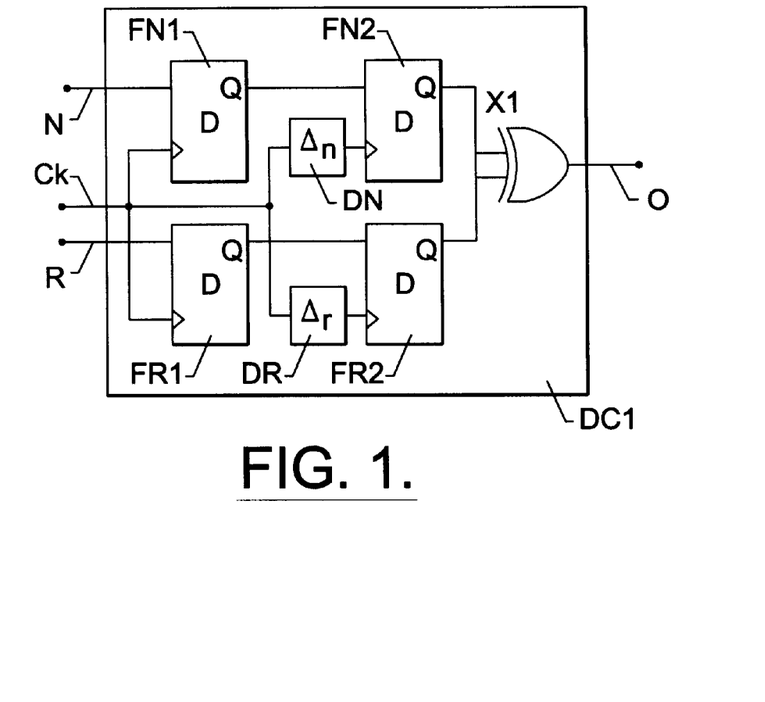
FIG. 1 is a diagram of the delay circuit according to a first embodiment of the present invention.

By referring to FIG. 1, a first embodiment of the circuit of the present invention will be described. The circuit includes a delay circuit DC1 having an input Ck for receiving a system clock signal, and two data inputs N and R, respectively coupled to a pair of positive edge-triggered, D-type flip-flops FN1 and FR1, synchronized by the clock signal Ck. The flip-flops FN1 and FR1 serve to synchronize the two digital streams or input streams N and R whenever they are reciprocally out of phase because of delays that may be introduced by upstream stages.

The outputs Q of the flip-flops FN1 and FR1, are coupled to the respective inputs of the pair of positive edge-triggered D-type flip-flops FN2 and FR2. However, these two flip-flops FN2 and FR2 are timed by two clock signals which are generally different from the system clock Ck and indeed are two differently delayed replicas of the system clock obtained by way of two delay circuits, respectively DN and DR, which delay the system clock Ck by an independently programmable time interval, respectively Dn and Dr.

In particular, one delay circuit DN delays the input clock Ck by a interval Dn, preferably slightly greater than the delay caused by the D-type flip-flops, while the other delay circuit DR delays the input clock Ck by a interval Dr such that the difference between Dr and Dn is substantially equal to the delay that must be introduced in the transitions immediately successive to another transition in the output data stream. The Q outputs of the flip-flops FN2 and FR2 are coupled to respective inputs of an XOR logic gate X1 that outputs (O) a recombined and selectively delayed data stream directed towards the write head of the mass storage device.

Figure 2:
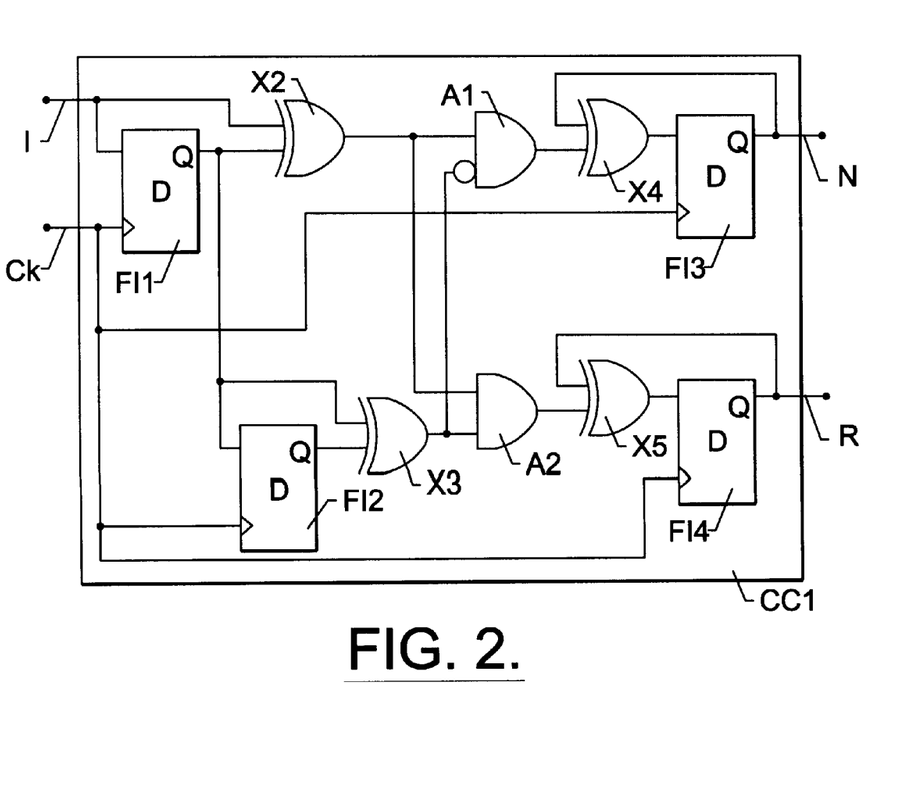
FIG. 2 is a diagram of the control circuit for the embodiment of FIG. 1.

By referring to FIG. 2, it may be observed that the N and R inputs of the delay circuit DC1 correspond to the N and R outputs of a control circuit CC1 which through one of its inputs receives the system clock signal Ck and through another input I, an input data stream directed toward the write head of the mass storage device after having selected and suitably delayed the transitions that follow an immediately preceding transition (obviously in terms of the succession of pulses of the clock signal Ck). Such a control circuit CC1 comprises a pair of XOR logic gates, X2 and X3, each of which serves to detect the presence of a transition respectively between the last and the second last input bit, as well as between the second last and third last input bit. Such preceding bits originate from a pair of D-type, positive edge-triggered flip-flops FI1, FI2 connected in cascade and synchronized with the clock signal Ck.

The logic gate X2 receives the signals coming from the input I and from the flip-flop FI1 as input, while the logic gate X3 receives the signals coming from the flip-flops FI1 and FI2 as input. With this arrangement, the output of the logic gate X2 is high if a transition has just occurred and the output of the logic gate X3 is high if a transition occurred in the preceding clock phase. The outputs of the logic gates X2 and X3 are in turn coupled to a pair of logic AND gates A1 and A2, respectively. While the logic gate A2 receives the outputs of logic gates X2 and X3 as input, the logic gate A1 receives the output of the logic gate X2 and the inverted output of the logic gate X3 as input. In this way, the output of the logic gate A1 is high if a transition has just occurred and if a transition has not taken place in the preceding clock phase, whereas the output of the logic gate A2 is high if two consecutive transitions have occurred.

Each output of the logic gates A1 and A2 outputs to a bistable switch which inverts its output from low to high and vice-versa in presence of a high input signal. According to an embodiment, the bistable are a pair of positive edge-triggered D-type flip-flop, FI3 and FI4, which receive the outputs of two logic XOR gates X4 and X5 as input, respectively. These gates receive the Q outputs of the flip-flops FI3 and FI4 and the outputs of the logic gates A1 and A2 as input. Therefore, the Q outputs of the flip-flops FI3 and FI4 coupled to the N and R outputs of the control circuit CC1, transmit two signals corresponding to the output of the two bistable switches controlled by the signals of the logic gates A1 and A2. Of course, in other embodiments, the bistable switches may be implemented by different circuits, for example by edge-triggered T-type flip-flops, generally referred to as toggle circuits.

The following truth table shows the state of the outputs of the components of the circuits DC1 and CC1 during 24 successive periods T, assuming for example, the data stream string of 24 bits "101011100001100101110101" as input, with the predefined state of the flip-flops FI1 and FI2 being a low state and the predefined state of the flip-flops FI3 and FI4 being a high state, and the parallel delays due to the FN1, FN2, FR1 and FR2 flip-flops being neglected.

TABLE 1 truth table of the DC1 and CC1 circuits

| T | I | FI1 | FI2 | X2 | X3 | A1 | A2 | N | R | O |
|---|---|-----|-----|----|----|----|----|----|----|---|
| 1 | 1 | 0 | 0 | 1 | 0 | 1 | 0 | 1 | 0 | 1 |
| 2 | 0 | 1 | 0 | 1 | 1 | 0 | 1 | 1 | 1 | 0 |
| 3 | 1 | 0 | 1 | 1 | 1 | 0 | 1 | 1 | 0 | 1 |
| 4 | 0 | 1 | 0 | 1 | 1 | 0 | 1 | 1 | 1 | 0 |
| 5 | 1 | 0 | 1 | 1 | 1 | 0 | 1 | 1 | 0 | 1 |
| 6 | 1 | 1 | 0 | 0 | 1 | 0 | 0 | 1 | 0 | 1 |
| 7 | 1 | 1 | 1 | 0 | 0 | 0 | 0 | 1 | 0 | 1 |
| 8 | 0 | 1 | 1 | 1 | 0 | 1 | 0 | 0 | 0 | 0 |
| 9 | 0 | 0 | 1 | 0 | 1 | 0 | 0 | 0 | 0 | 0 |
| 10 | 0 | 0 | 0 | 0 | 0 | 0 | 0 | 0 | 0 | 0 |
| 11 | 0 | 0 | 0 | 0 | 0 | 0 | 0 | 0 | 0 | 0 |
| 12 | 1 | 0 | 0 | 1 | 0 | 1 | 0 | 1 | 0 | 1 |
| 13 | 1 | 1 | 0 | 0 | 1 | 0 | 0 | 1 | 0 | 1 |
| 14 | 0 | 1 | 1 | 1 | 0 | 1 | 0 | 0 | 0 | 0 |
| 15 | 0 | 0 | 1 | 0 | 1 | 0 | 0 | 0 | 0 | 0 |

TABLE 1-continued truth table of the DC1 and CC1 circuits

| T | I | FI1 | FI2 | X2 | X3 | A1 | A2 | N | R | O |
|---|---|-----|-----|----|----|----|----|---|---|---|
| 16 | 1 | 0 | 0 | 1 | 0 | 1 | 0 | 1 | 0 | 1 |
| 17 | 0 | 1 | 0 | 1 | 1 | 0 | 1 | 1 | 1 | 0 |
| 18 | 1 | 0 | 1 | 1 | 1 | 0 | 1 | 1 | 0 | 1 |
| 19 | 1 | 1 | 0 | 0 | 1 | 0 | 0 | 1 | 0 | 1 |
| 20 | 1 | 1 | 1 | 0 | 0 | 0 | 0 | 1 | 0 | 1 |
| 21 | 0 | 1 | 1 | 1 | 0 | 1 | 0 | 0 | 0 | 0 |
| 22 | 1 | 0 | 1 | 1 | 1 | 0 | 1 | 0 | 1 | 1 |
| 23 | 0 | 1 | 0 | 1 | 1 | 0 | 1 | 0 | 0 | 0 |
| 24 | 1 | 0 | 1 | 1 | 1 | 0 | 1 | 0 | 1 | 1 |

As may be observed from the above table, the input and output data stream are equal, however, such a data stream is actually subjected to a decomposition in two parallel digital streams, the transitions of which are delayed by two different time intervals Dn and Dr, before the two streams are recombined in a unique flow of digital data through the logic XOR gate X1. In particular, in the embodiment shown, the digital stream to be delayed propagated through the input N on the signal path comprising the delay circuit DN, contains the nonconsecutive transitions of the input stream I, while the digital stream to be delayed, propagated through the input R on the line comprising the delay circuit DR, contains the consecutive transitions of the input stream I. In this way, the two digital streams N and R, suitably delayed by different amounts, may be recombined in the logic gate X1 thus reconstructing the input data stream wherein the transitions that immediately follow another are delayed by a certain pre-established interval.

Figure 3:
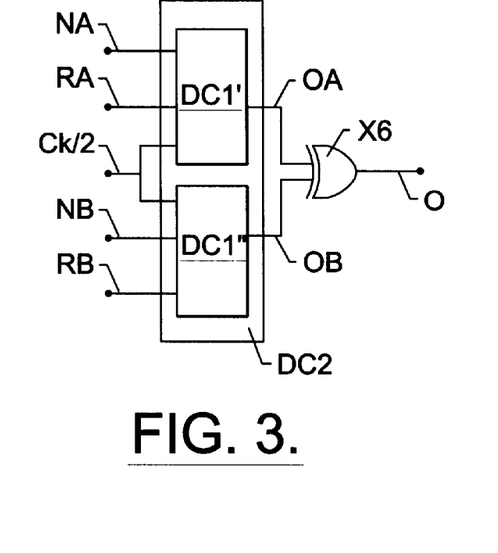
FIG. 3 is a diagram of the delay circuit according to a second embodiment of the present invention.

By referring to FIG. 3, according to another embodiment, the device of the present invention comprises a delay block DC2 that includes two delay circuits DC1' and DC1", each similar to the delay circuit DC1 of the embodiment described above. The circuits DC1' and DC1" receive the RA, NA, RB, NB, signals as input which are similar to the R and N inputs of the delay circuit DC1 described above. The DC1' and DC1" circuits receive a clock signal Ck/2, whose frequency is halved by a dedicated circuit (not shown in the figure). The OA and OB outputs of the delay circuits DC1' and DC1" are combined in a logic XOR gate X6, which outputs the data stream directed to the write head of the mass storage support. Briefly delayed by the delay circuits DC1' and DC1" respectively by the intervals of time Dn and Dr, the lines NA, RA and NB, RB converge towards the output O.

Figure 4:
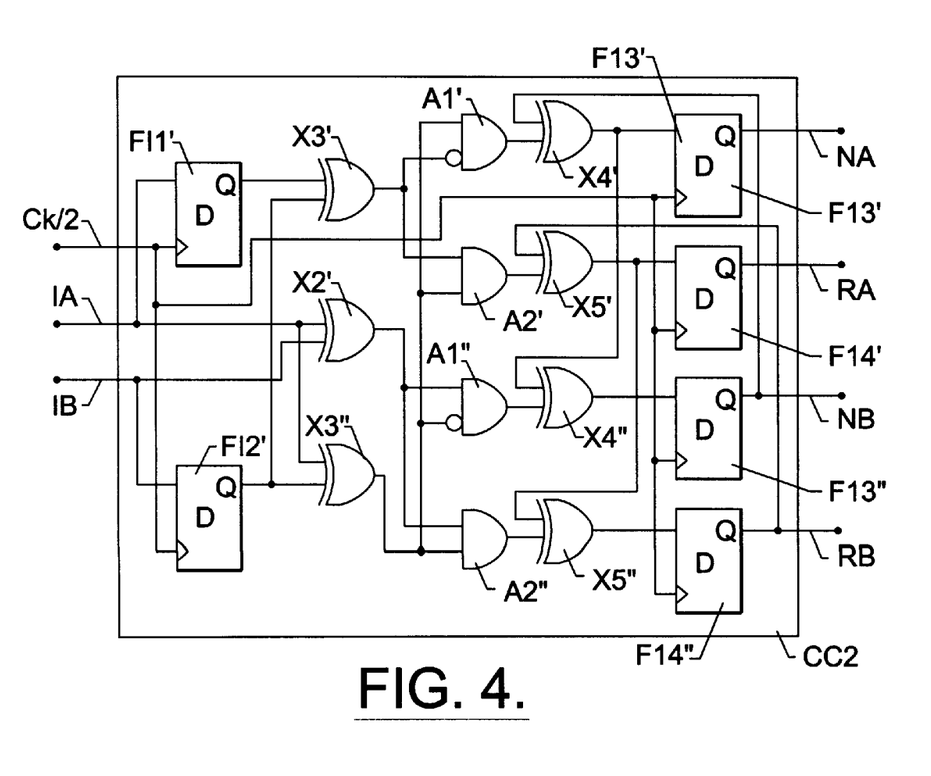
FIG. 4 is a diagram of the control circuit for the embodiment of FIG. 3.

With reference to FIG. 4, the NA, RA and NB, RB outputs of the control circuit CC2 are input to the delay circuit DC2. The control circuit CC2 receives the halved system clock signal Ck/2 and two streams IA and IB, respectively the odd bits and the even bits of the input data stream. It should be noted that the control circuit CC2 is functionally similar to the control circuit CC1, the functional components being connected in a tree-like structure in order to handle two data streams.

In particular, the control circuit CC2 comprises a pair of logic gates X2', X3' and a further XOR gate X3", each of which serves to detect the presence of a transition, between the last odd bit and the last even bit and the second last odd bit and the second last even bit, as well as between the last odd bit and the second last even bit of the input stream. Such preceding bits are derived from a pair of positive edge-triggered D-type flip-flops, FI1', FI2', connected in cascade and synchronized by the signal Ck/2. The logic gate X2' receives the signals from the IA and IB inputs, the logic gate X3' receives the signals output by the FI1' and FI2' flip-flops as input while the logic gate X3' receives the signals from the IA input and from the FI2' flip-flop as input. In this way the output of the logic gate X2' is high if a transition has just occurred, the output of the logic gate X3' is high if a transition occurred in the preceding clock phase and the output of the logic gate X3" is high if there has been a transition between the even bit and the odd bit during the preceding clock phase.

The outputs of the logic gates X2', X3' and X3" are coupled to two pairs of logic AND gates A1', A2' and A1", A2", respectively. The gates A2', A2" receive the outputs of the gates X3', X3" and X2', X3" as input, respectively, the logic gates A1', A1" receive the output of the gate X3" and the inverted output of the gate X3' as input, respectively, and the output of the gate X2' and the inverted output of the logic gate X3" as input, respectively.

Each output of the logic gates A1', A2' and A1", A2", is coupled to a bistable switch. In this embodiment, such bistable switches include two pairs of positive edge-triggered D-type flip-flops: FI3', FI4' and FI3", FI4", which receive the outputs of two pairs of logic XOR gates: X4', X4" and X5', X5" as input. These gates receive the Q outputs of the FI3" and FI4" flip-flops and the outputs of the logic gates X4', X5', as well as the outputs of the logic gates A1', A2' and A1", A2" as input. The Q outputs of the flip-flops FI3', FI4" and FI3", FI4", respectively coupled to the outputs NA, RA and NB, RB of the control circuit CC2, transmit two pairs of digital streams corresponding to the outputs of the two pairs of bistable switches controlled by the signals of the logic gates A1', A2' and A1", A2". Of course, the bistable switches may also be implemented by similar circuits, for example with edge-triggered T-type flip-flops, usually referred to as toggle circuits.

The following truth table shows the output state of the components of the circuits DC2 and CC2 in 24 successive clock phases T, assuming, for example, the data stream string of 24 bits "101011100001100101110101" as input, with the predefined state of the FI1' and FI2' flip-flops being the low state and the predefined state of the flip-flops FI3', FI4' and FI3", FI4", being the high state, the parallel delays due to the flip-flops of the delay circuit DC2 being neglected. In particular, the alternate data streams of the O output, obtained by alternatively combining through the X6 gate the data stream of the OB output with the data stream of the OA output, are indicated in columns O' and O".

TABLE 2 truth table of the DC2 and CC2 circuits

| T | IA | IB | FI1' | FI2' | X2' | X3' | X3" | A1' | A2' | A1" | A2" | NA | RA | NB | RB | OA | OB | O' | O" |
|---|----|----|------|------|-----|-----|-----|-----|-----|-----|-----|----|----|----|----|----|----|----|-----|
| 1 | 1 | 0 | 0 | 0 | 0 | 1 | 0 | 1 | 1 | 0 | 0 | 1 | 0 | 1 | 1 | 0 | 1 | 1 | 0 |
| 2 | 1 | 0 | 0 | 1 | 0 | 1 | 1 | 1 | 0 | 1 | 0 | 1 | 0 | 0 | 1 | 1 | 0 | 0 | 1 | 0 |

TABLE 2-continued truth table of the DC2 and CC2 circuits

| T | IA | IB | FI1' | FI2' | X2' | X3' | X3" | A1' | A2' | A1" | A2" | NA | RA | NB | RB | OA | OB | O' | O" |
|---|----|----|------|------|-----|-----|-----|-----|-----|-----|-----|----|----|----|----|----|----|----|----|
| 3 | 1 | 1 | 1 | 0 | 0 | 1 | 1 | 0 | 1 | 0 | 0 | 0 | 1 | 1 | 1 | 1 | 0 | 1 | 1 |
| 4 | 1 | 0 | 1 | 1 | 1 | 0 | 0 | 0 | 0 | 1 | 0 | 0 | 1 | 0 | 1 | 1 | 1 | 1 | 0 |
| 5 | 0 | 0 | 1 | 0 | 0 | 1 | 0 | 0 | 0 | 0 | 0 | 0 | 1 | 0 | 1 | 1 | 1 | 0 | 0 |
| 6 | 0 | 1 | 0 | 0 | 1 | 0 | 0 | 0 | 0 | 1 | 0 | 0 | 1 | 1 | 1 | 1 | 0 | 0 | 1 |
| 7 | 1 | 0 | 0 | 1 | 1 | 1 | 0 | 0 | 0 | 1 | 0 | 0 | 1 | 0 | 1 | 1 | 1 | 1 | 0 |
| 8 | 0 | 1 | 1 | 0 | 1 | 1 | 0 | 0 | 0 | 1 | 0 | 0 | 1 | 1 | 1 | 1 | 0 | 0 | 1 |
| 9 | 0 | 1 | 0 | 1 | 1 | 1 | 1 | 0 | 1 | 0 | 1 | 0 | 0 | 1 | 0 | 0 | 1 | 0 | 1 |
| 10 | 1 | 1 | 0 | 1 | 0 | 1 | 0 | 0 | 0 | 0 | 0 | 0 | 0 | 1 | 0 | 0 | 1 | 1 | 1 |
| 11 | 0 | 1 | 1 | 1 | 1 | 0 | 1 | 1 | 0 | 0 | 1 | 1 | 0 | 1 | 1 | 1 | 0 | 0 | 1 |
| 12 | 0 | 1 | 0 | 1 | 1 | 1 | 1 | 0 | 1 | 0 | 1 | 1 | 1 | 1 | 0 | 0 | 1 | 0 | 1 |

Also in this embodiment, the input and output data streams are equivalent, though the data stream is subjected to a decomposition in two distinct streams, the transitions of which are differently delayed before recombining the two streams through the logic XOR gate X6.

Figure 5:
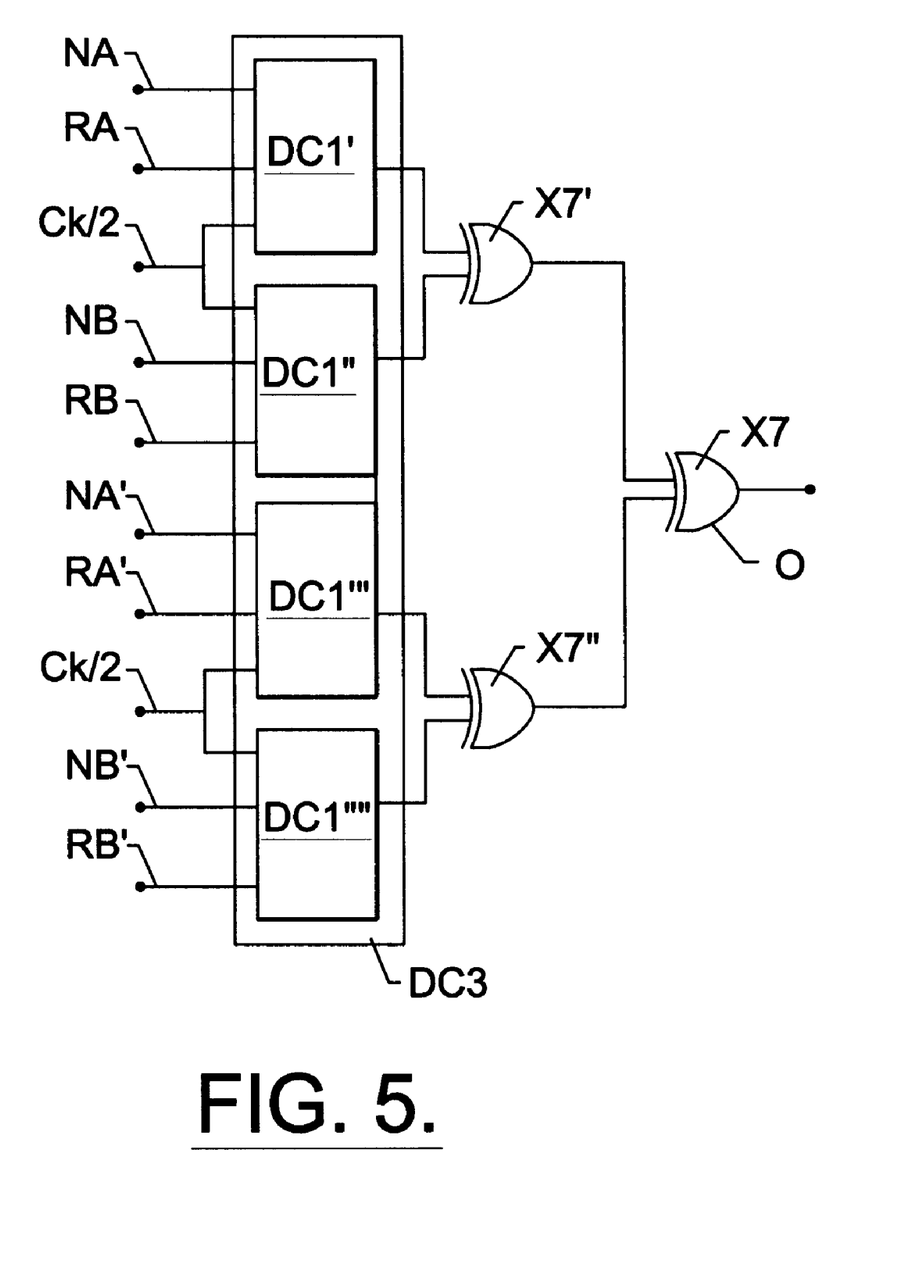
FIG. 5 is a diagram of the delay circuit according to a third embodiment of the present invention.

FIG. 5 depicts yet another embodiment of the device of the present invention comprising a delay block DC3 which in turn includes two pairs of delay circuits DC1', DC1" and DC1''', DC1'''', all functionally similar to the circuit DC1 of the first embodiment. These multiple delay circuits are connected to a plurality of logic XOR gates X7, X7' and X7" in form of a tree-like structure terminating with the output O which outputs the data stream directed to the write head. The delay circuits DC1', DC" and DC1''', DC"" receive signals equivalent to those received through the R and N inputs of the delay circuits DC1 of FIG. 1, through the RA, NA, RB, NB and RA', NA', RB', NB' inputs, respectively. However, in this embodiment, the input data stream, besides being subdivided in two alternate streams by a control circuit equivalent to the control circuit CC2 of FIG. 4, is further decomposed and fed through the RA', NA', RB', NB' inputs for further delaying the transitions that follow a second transition of a series of consecutive transitions. Briefly, after having been delayed by the delay circuits DC1''' and DC1"" with additional time intervals Dn' and Dr', lower than the Dn and Dr intervals that are introduced by the delay circuits DC1' and DC", the input streams NA', RA', NB', RB' merge at the O output.

From the above description of preferred embodiments of the device according to the present invention, it is evident that in similar embodiments, more parallel streams on lines, N and R, may be contemplated with each delayed by a certain time interval different from the other streams, which are then all merged through a plurality of logic XOR gates disposed according to a tree structure, to obtain a recomposed data stream with selected transitions suitably delayed, to be fed to the write head of the mass storage device. Of course, the plurality of parallel streams will be generated by a control circuit comprising a plurality of flip-flops and XOR and AND gates, also functionally arranged in a tree structure.

Other variations may be introduced by skilled artisans in the above described embodiments though remaining within the scope of the present invention.

That which is claimed is:

1. A method of delaying a transition in a digital data stream fed to a write head of a storage device by a predetermined time interval when the transition occurs at a clock phase following the clock phase during which a preceding transition has occurred, for pre-compensating for intersymbol nonlinear interference effects produced when reading stored data, the method comprising the steps of:

inputting the digital data stream and a clock signal to a first circuit;

outputting, from the first circuit, a pair of digital data streams including a first digital data stream which has a first logic value when a transition of the input digital data stream occurs during a clock phase that is not successive to a clock phase during which a transition of the input digital data stream has occurred, and a second digital data stream which has the first logic value when a transition of the input digital data stream occurs during a clock phase following a clock phase during which a transition has occurred in the input digital data stream;

feeding the first and second digital data streams and the clock signal to respective inputs of a second circuit; and outputting, from the second circuit, an output digital data stream directed to the write head, in which transitions immediately following a preceding transition are delayed by the predetermined time interval, by sampling the first and second digital data streams with a first pair of flip-flops, each of which is respectively timed by clock signals respectively delayed by a different time interval and such that the difference between the different time intervals is equal to the predetermined time interval, and recombining the first and second digital data streams output from the pair of flip-flops through a logic XOR gate into the output digital data stream.

2. The method according to claim 1, wherein the step of outputting the output digital data stream includes resynchronizing the first and second digital data streams through a second pair of flip-flops which are timed by the clock signal, before sampling the first and second digital data streams with the first pair of flip-flops.

3. A method of writing to a data storage device comprising the steps of:

determining whether a transition in a digital data stream occurs at a clock phase following a clock phase during which a preceding transition has occurred;

generating a first digital data stream having a first logic value when the transition of the digital data stream occurs during a clock phase that does not succeeed the clock phase during which a transition of the digital data stream occurred;

generating a second digital data stream having the first logic value when the transition of the digital data stream occurs during a clock phase that does succeed the clock phase during which the transition of the digital data stream occurred;

sampling the first digital data stream using a first delayed clock signal, and sampling the second digital data stream using a second delayed clock signal which is delayed by a different time interval than the first delayed clock signal, and such that a difference between the different time intervals is equal to a predetermined time interval;

combining the sampled first and second digital data streams as an output digital data stream; and writing the output digital data stream to the data storage device with transitions immediately succeeding a preceding transition being delayed by the predetermined time interval.

4. The method according to claim 3, further comprising the step of resynchronizing the first digital data stream using a clock signal, and resynchronizing the second digital data stream using the clock signal, before sampling the first and second digital data streams.

5. The method according to claim 3, wherein the method pre-compensates for intersymbol nonlinear interference effects that are produced when reading the stored data.

6. The method according to claim 3, wherein the steps of generating the first and second digital data streams include inputting the digital data stream and a clock signal to a first circuit.

7. The method according to claim 6, wherein the first and second digital data streams are output from the first circuit.

8. The method according to claim 7, wherein the steps of sampling the first and second digital data streams include inputting the first and second digital data streams and the clock signal to a second circuit.

9. The method according to claim 8, wherein the second circuit comprises a first flip-flop for sampling the first digital data stream using the first delayed clock signal, and a second flip-flop for sampling the second digital data stream using the second delayed clock signal.

10. The method according to claim 9, wherein the step of combining the sampled first and second digital data streams includes combining outputs from the first and second flip-flops through a logic XOR gate.

11. The method according to claim 10, further comprising the step of resynchronizing the first digital data stream with a third flip-flop using the clock signal, and resynchronizing the second digital data stream with a fourth flip-flop using the clock signal, before sampling the first and second digital data streams.

12. A device for delaying a transition immediately following a preceding transition in a digital data stream, comprising:

a control circuit for detecting a first transition in the digital data stream that occurs during a clock phase succeeding an immediately preceding clock phase during which a transition has not occurred, and for detecting a second transition in the digital data stream that occurs during a clock phase succeeding an immediately preceding clock phase during which a transition has occurred, the control circuit comprising at least first and second output bistable switches timed by the clock signal, the first output bistable switch outputting a first digital data stream corresponding to the first transition, and the second output bistable switch outputting a second digital data stream corresponding to the second transition; and a delay circuit for delaying the second transition by a predetermined time interval, and comprising at least a logic XOR gate which receives the first and second digital streams, the transitions of which are delayed from each other by different time intervals such that the difference is equal to a predetermined time interval, and outputs an output digital data stream.

13. A device according to claim 12, wherein the delay circuit further comprises at least a first pair of flip-flops timed with respective differently delayed clock signals, and having outputs connected to inputs of the logic XOR gate.

14. A device according to claim 13, wherein the delay circuit further comprises at least a second pair of resynchronization flip-flops timed by the clock signal and having outputs respectively connected to inputs of the first pair of flip-flops.

15. A device according to claim 12, wherein the delay circuit comprises a plurality of pairs of flip-flops and a plurality of XOR gates, organized in a tree structure, the flip-flops being timed with differently delayed clock signals.

16. A device according to claim 15, wherein the control circuit further comprises a plurality of input flip-flops for a plurality of distinct input digital data streams and a plurality of output bistable switches relative to a plurality of pairs of propagation lines comprising XOR and AND gates to define a combinational logic circuit for detection and separation of the first and second transitions, organized in a tree structure.

17. A device according to claim 12, wherein each of the output bistable switches of the control circuit comprises a flip-flop timed with the clock signal and the control circuit further comprises input flip-flops and a combinational logic circuit for detecting and separating the first transition from the second transition, the combinational logic circuit including a first XOR plane, an AND plane and a second XOR plane.

18. A device according to claim 17, wherein the device is a CMOS device.

19. A device for writing to a data storage device, comprising:

a control circuit for detecting a first transition in the digital data stream that occurs during a clock phase succeeding an immediately preceding clock phase during which a transition has not occurred, for detecting a second transition in the digital data stream that occurs during a clock phase succeeding an immediately preceding clock phase during which a transition has occurred, and for outputting a first digital data stream corresponding to the first transition, and a second data digital stream corresponding to the second transition; and a delay circuit for receiving the first and second digital data streams, for delaying the second transition by a predetermined time interval, and for outputting an output digital data stream.

20. A device according to claim 19, wherein the control circuit comprises at least first and second output bistable switches timed by a clock signal, and for respectively outputting the first digital data stream corresponding to the first transition, and the second digital data stream corresponding to the second transition.

21. A device according to claim 20, wherein each of the output bistable switches of the control circuit comprises a flip-flop timed with the clock signal, and t he control circuit further comprises input flip-flops and a combinational logic circuit for detecting and separating the first transition from the second transition, the combinational logic circuit including a first XOR plane, an AND plane and a second XOR plane.

22. A device according to claim 19, wherein the delay circuit receives the first and second digital data streams with the transitions being delayed from each other by different time intervals such that the difference is equal to the predetermined time interval.

23. A device according to claim 22, wherein the delay circuit further comprises:

at least a first pair of flip-flops timed with respective differently delayed clock signals; and a logic XOR gate for receiving ouputs of the first pair of flip-flops.

24. A device according to claim 23, wherein the delay circuit further comprises at least a second pair of resynchronization flip-flops timed by the clock signal and having outputs respectively connected to inputs of the first pair of flip-flops.

25. A device according to claim 19, wherein the delay circuit comprises a plurality of pairs of flip-flops and a plurality of XOR gates, organized in a tree structure, the flip-flops being timed with differently delayed clock signals.

26. The device according to claim 25, wherein the control circuit further comprises a plurality of input flip-flops for a plurality of distinct input digital data streams and a plurality of output bistable switches relative to a plurality of pairs of propagation lines comprising XOR and AND gates to define a combinational logic circuit for detection and separation of the first and second transitions, organized in a tree structure.

27. A disk drive comprising:

a data storage disk; and a write channel for carrying data to be written to the data storage disk, the write channel comprising a write head for writing data to the data storage disk, and a device for delaying a transition in a digital data stream fed to the write head by a predetermined time interval when the transition occurs at a clock phase following the clock phase during which a preceding transition h as occurred, the device comprising a control circuit for detecting a first transition in the digital data stream that occurs during a clock phase succeeding an immediately preceding clock phase during which a transition has not occurred, for detecting a second transition in the digital data stream that occurs during a clock phase succeeding an immediately preceding clock phase during which a transition has occurred, and for outputting a first digital data stream corresponding to the first transition, and a second data digital stream corresponding to the second transition, and a delay circuit for receiving the first and second digital data streams, for delaying the second transition by the predetermined time interval, and for outputting an output digital data stream.

28. A disk drive according to claim 27, wherein the control circuit comprises at least first and second output bistable switches timed by a clock signal, and for respectively outputting the first digital data stream corresponding to the first transition, and the second digital data stream corresponding to the second transition.

29. A disk drive according to claim 28, wherein each of the output bistable switches of the control circuit comprises a flip-flop timed with the clock signal, and the control circuit further comprises input flip-flops and a combinational logic circuit for detecting and separating the first transition from the second transition, the combinational logic circuit including a first XOR plane, an AND plane and a second XOR plane.

30. A disk drive according to claim 27, wherein the delay circuit receives the first and second digital data streams with the transitions being delayed from each other by different time intervals such that the difference is equal to the predetermined time interval.

31. A disk drive according to claim 30, wherein the delay circuit further comprises:

at least a first pair of flip-flops timed with respective differently delayed clock signals; and a logic XOR gate for receiving ouputs of the first pair of flip-flops.

32. A disk drive according to claim 31, wherein the delay circuit further comprises at least a second pair of resynchronization flip-flops timed by the clock signal and having outputs respectively connected to inputs of the first pair of flip-flops.

33. A disk drive according to claim 27, wherein the delay circuit comprises a plurality of pairs of flip-flops and a plurality of XOR gates, organized in a tree structure, the flip-flops being timed with differently delayed clock signals.

34. A disk drive according to claim 33, wherein the control circuit further comprises a plurality of input flip-flops for a plurality of distinct input digital data streams and a plurality of output bistable switches relative to a plurality of pairs of propagation lines comprising XOR and AND gates to define a combinational logic circuit for detection and separation of the first and second transitions, organized in a tree structure.

* * * * *

UNITED STATES PATENT AND TRADEMARK OFFICE
CERTIFICATE OF CORRECTION

PATENT NO. : 6,208,184 B1
DATED : March 27, 2001
INVENTOR(S) : Marco Demicheli, Melchiorre Bruccoleri, Maurizio Malfa, Giacomino Bollati It is certified that error appears in the above-identified patent and that said Letters Patent is hereby corrected as shown below:

<u>Column 4,</u>
Line 28, delete "bistable are" insert -- bistable switches are --
Line 29, delete "flip-flop" insert -- flip-flops --

<u>Column 10,</u>
Line 55, delete "and t he" insert -- and the --

<u>Column 11,</u>
Line 32, delete "transition h as" insert -- transition has --

Signed and Sealed this

Sixteenth Day of October, 2001

*Attest:*

NICHOLAS P. GODICI
*Attesting Officer*     *Acting Director of the United States Patent and Trademark Office*